United States Patent [19]

Shaffer

[11] Patent Number: 4,487,340

[45] Date of Patent: Dec. 11, 1984

[54] ADJUSTABLE METERING OIL PUMP

[76] Inventor: Frank E. Shaffer, 33 Beach Dr., Newport Beach, Calif. 92663

[21] Appl. No.: 399,196

[22] Filed: Jul. 16, 1982

[51] Int. Cl.³ .................... B67D 5/40; F04B 17/04; F04B 39/10
[52] U.S. Cl. .................... 222/385; 417/259; 417/417; 417/443; 417/545
[58] Field of Search ............ 417/417, 259, 511, 443, 417/545, 551, 416, 418; 141/115, 116, 117; 137/533.27, 533.11, 533.13; 222/385

[56] References Cited

U.S. PATENT DOCUMENTS

| | | | |
|---|---|---|---|
| 460,223 | 9/1891 | Smith | 417/545 X |
| 544,376 | 8/1895 | Porter | 137/533.11 X |
| 2,381,650 | 8/1945 | Dick | 417/417 |
| 2,437,605 | 3/1948 | Karge | 408/61 |
| 3,023,936 | 3/1962 | Marsh et al. | 141/116 X |
| 3,330,217 | 7/1967 | Baur et al. | 417/555 |
| 3,521,794 | 7/1970 | Bijl | 417/416 X |
| 3,812,542 | 5/1974 | Shiley | 137/533.27 X |
| 4,172,471 | 10/1979 | Bjorklund | 141/117 X |

FOREIGN PATENT DOCUMENTS 1187713 4/1970 United Kingdom ............... 417/417

Primary Examiner—Richard E. Gluck
Assistant Examiner—Peter M. Cuomo
Attorney, Agent, or Firm—Fulwider, Patton, Rieber, Lee & Utecht

[57] ABSTRACT

A reciprocating pump for delivering cutting fluid to the machining situs between a tool and a workpiece includes a collapsible piston which forms a substantial seal in the pump during the power stroke and then collapses during the relaxation stroke to allow the piston to reassume its initial position in preparation for the next power stroke. The pump includes an indexer and switch which maintain the pump in an operative condition, thereby delivering cutting fluid to the machining situs for a predetermined amount of displacement between the tool and workpiece prior to engagement and subsequent thereto. The indexer and switch exploit a predetermined amount of play in the switch to maintain the pump in an operative condition for the desired time. The pump also includes a one-way check valve at its inlet port which incorporates a positive pumping action to force a predetermined amount of fluid through the inlet port in the reverse direction, thereby preventing dribbling, siphoning, or a miniscus from forming at the delivery nozzle of the pump. A main feature is to allow precise control of the amount of cutting fluid applied for extremely light to medium machining operations for ecomony of expensive cutting fluids and for reduction of the hazard to the machine operator from the prior art practice of using an oil mist or a small brush to apply cutting fluid to the rotating cutting tool.

2 Claims, 11 Drawing Figures

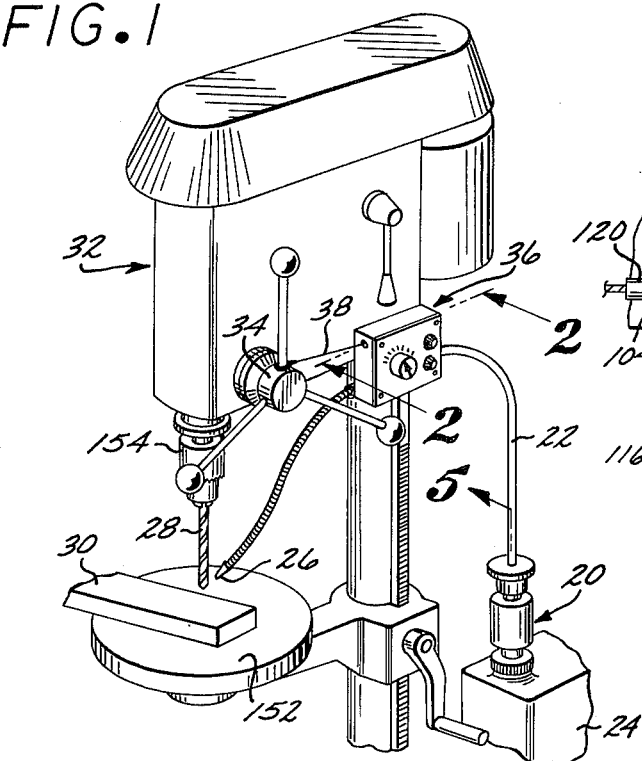
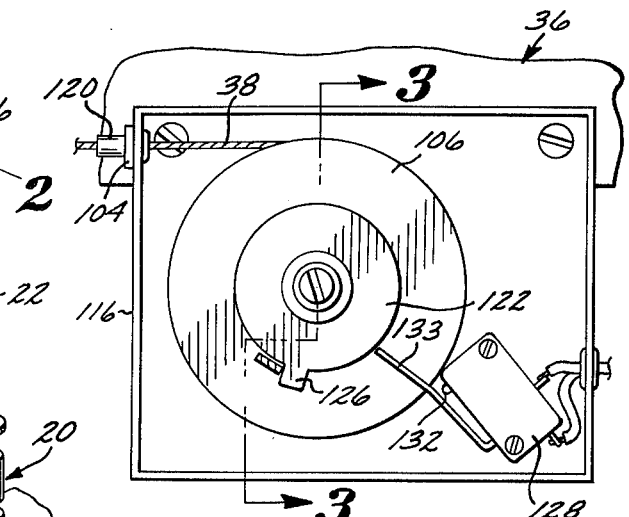
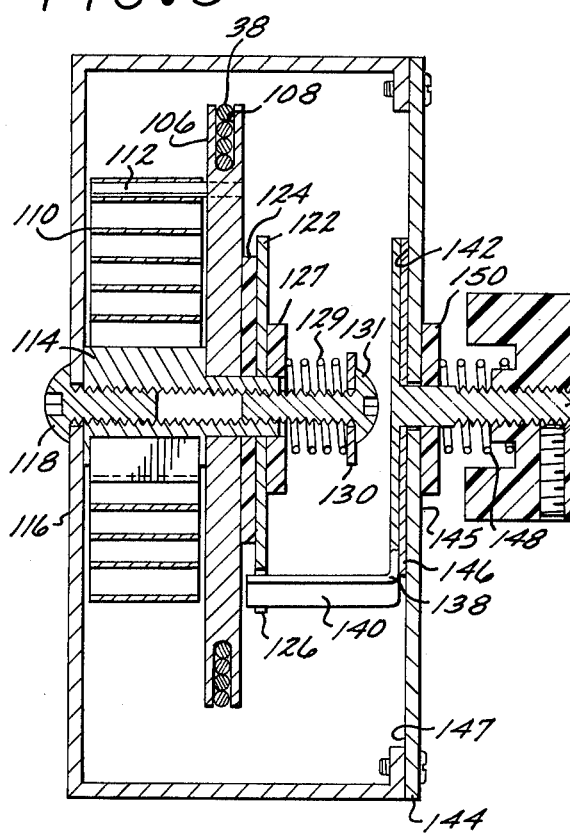
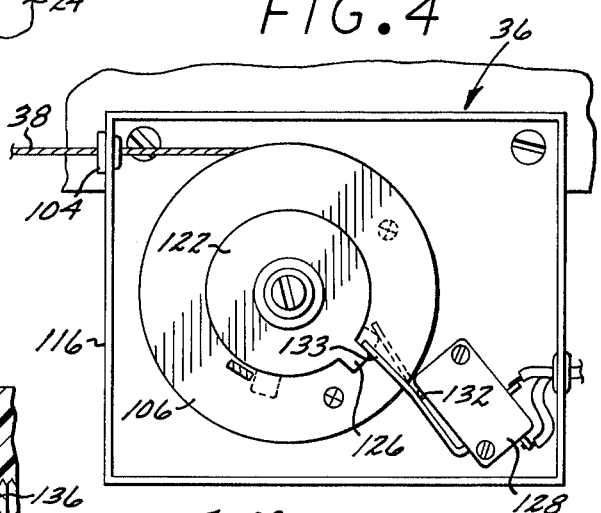
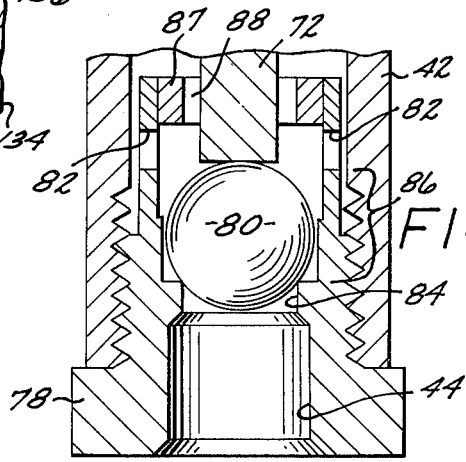

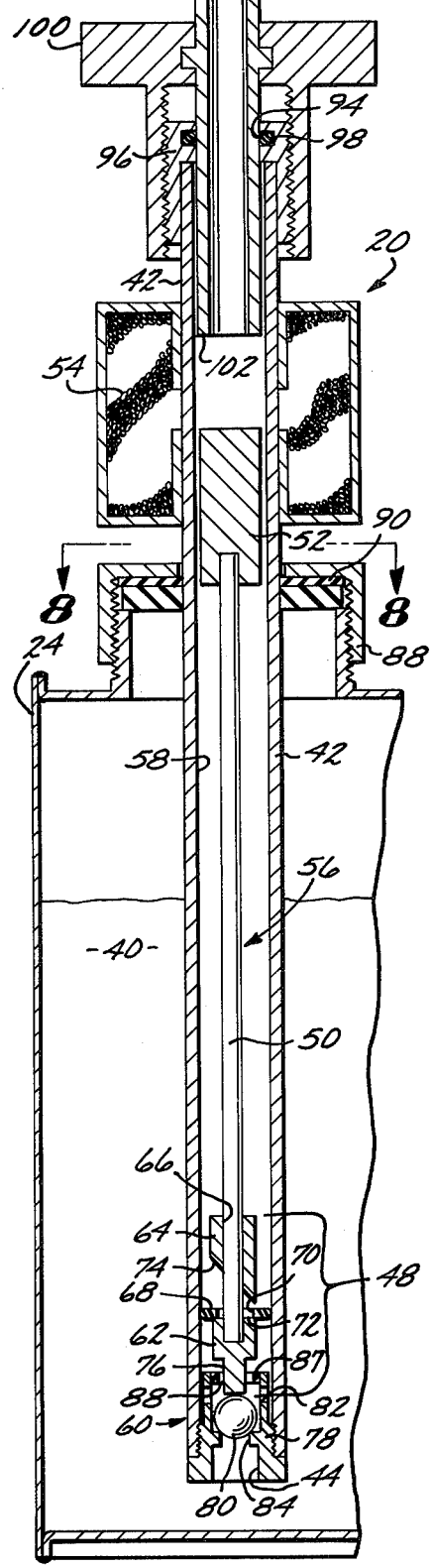
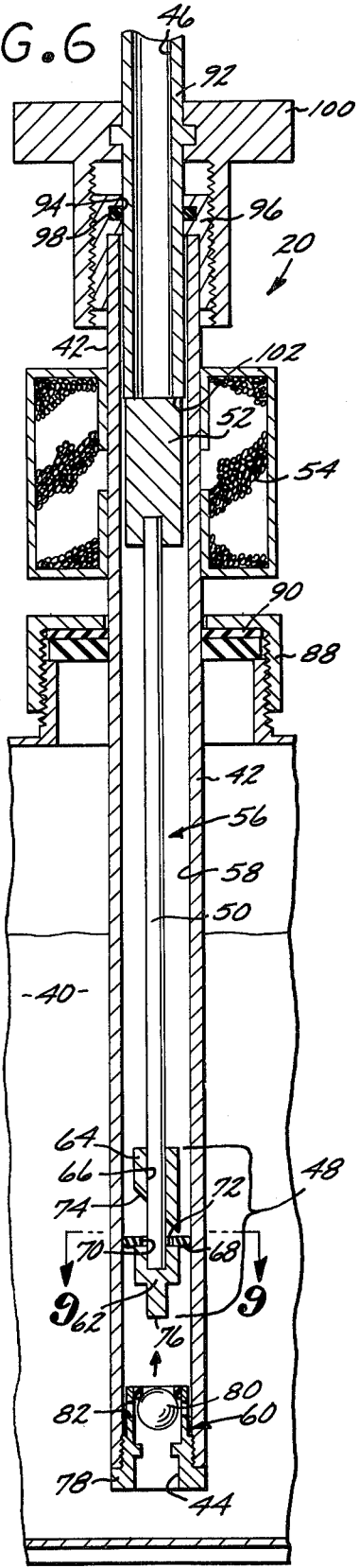
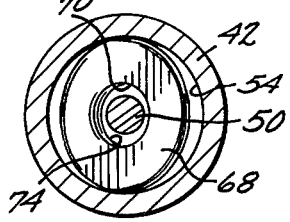
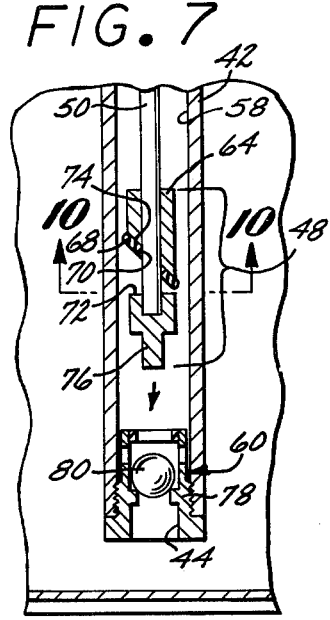

ADJUSTABLE METERING OIL PUMP

BACKGROUND OF THE INVENTION

1. Field of the Invention

The present invention relates to a pump for applying cutting fluids to a tool and workpiece in machining operations, and more particularly, relates to a nonrecirculating, solenoid operated pump used in tooling applications.

2. Description of the Prior Art

Heat and chips are carried away from a cutting site where a tool operatively engages a workpiece by a cooling and lubricating fluid which is sprayed or poured onto the workpiece during the machining operation. According to one method, the fluid sprayed onto the cutting site is typically collected in a tank which includes a sump pump. The pump recirculates the fluid, usually an oil, back to the cutting tool through a hose and nozzle. Another common method is to atomize the cutting fluid by producing a mist which is blown at the cutting site. In both cases, cutting fluid is provided on a continuous basis to a large area of the workpiece rather than to just the cutting point during that time during which actual machining occurs. Each method uses a small pump as the essential operative element. Solenoid operated reciprocating pumps are particularly well adapted to intermittent, light duty applications such as this.

Bauer, et al., "Pump", U.S. Pat. No. 3,330,217, shows a rod-like reciprocating pump which uses a rigid reciprocating piston element 130, shown in FIGS. 1 and 3, to pump fluid from an internal chamber into a side port by utilizing the displacing effect of a large, cylindrical piston. A ball check valve is used at the inlet port to restrain the fluid within the pumping chamber as it is displaced from the chamber by the piston into the outlet port.

Solenoid operated pumps utilizing a reciprocating piston are also well-known in the art. Examples are described by Toyoda, et al., "Electromagnetic Pump", U.S. Pat. No. 3,958,902, and "Electromagnetic Plunger Pump", U.S. Pat. No. 4,150,924; and Brooks, "Solenoid Pump", U.S. Pat. No. 2,806,432. However, each of the known prior art references include a system of valving necessitating at least two check valves in order to effectuate a net flow of fluid through the reciprocating pump. Moreover, no means is taught by which oil discharged by the pump can be prevented from siphoning from the discharge nozzle. In addition, each pump is particularly characterized by having a pumping piston within an axial chamber, which piston has a fixed configuration during the power stroke as well as the relaxation stroke. More complex electromagnetic reciprocating pumps have also been devised using independent magnetic coils to actuate the plunger and valving necessary to effectuate a net flow of fluid through the pump.

What is needed is a design for a reciprocating pump which is simplified and reliable and which includes a means for preventing siphoning from the discharge line when the pump is turned off.

BRIEF SUMMARY OF THE INVENTION

The present invention is an apparatus for providing a pulsating stream of lubricating and cooling fluid or oil to the cutting surface between the tool or milling bit and a workpiece.

The apparatus includes a pump which comprises an elongated chamber and a first end which is operative to serve as an inlet port and a second end operative to serve as an outlet port. A reciprocating main or collapsible piston is disposed in the chamber and includes a plate which is disposable in a first configuration for substantially sealing the chamber. Fluid disposed within the chamber is lifted by the piston when it is drawn up within the chamber. The plate is disposed in this first position, namely the position of substantial sealing, for exerting a maximal amount of force on the fluid when the piston is displaced within the chamber in a power stroke direction. The plate is disposable in a second configuration to minimize the amount of force exerted by the plate on the fluid within the chamber when the piston is displaced within the chamber in a relaxation stroke direction, which is opposite to the power stroke direction. Therefore, by reciprocating the piston within the chamber, a preferential displacement of fluid in the chamber results.

More particularly, the collapsible piston is formed by a washer telescoped over a stem and slidable thereon to be held in a tilted position to accomodate flow therepast during retraction of the piston and to be held oriented normal to the direction of travel to block flow therepast during the pumping stroke.

A ferromagnetic armature is fitted to the end of the piston rod opposing the collapsible or main piston. During the relaxation stroke, a one-way check valve disposed near the inlet port of the chamber substantially prevents fluid from being forced out through the inlet port in the reverse direction during the relaxation stroke. Clearance between the armature and the sides of the chamber is sufficient to allow the entire piston assembly, including the armature and collapsible piston, to easily descend through the chamber during the relaxation stroke, allowing fluid to flow upwardly past the collapsed main piston and between the clearance between the chamber wall and armature.

The one way check valve includes a sphere disposed within a retaining element. The retaining element defines a small cylindrical chamber into which the sphere is disposed, either by fluid flowing through the one way check valve during the relaxation stroke, or positively actuated by a finger at the end of the piston rod extendable through the retaining element and contacting the sphere, thereby positively forcing the sphere toward the inlet port. The cylindrical chamber, defined by the retaining element, has a valve seat which is arranged and configured to mate with the sphere, thereby providing positive closure when the sphere and valve seat contact. The sphere has a diameter which is slightly less than the diameter of the cylindrical chamber. The cylindrical chamber, in turn, has a height which is greater than the radius of the sphere by a predetermined amount. Therefore, disposition of the sphere into the cylindrical chamber is effective to force a predetermined amount of fluid from the cylindrical chamber through the inlet port in the reverse direction. The amount of fluid thus forced in the reverse direction is proportional to the displacement of the sphere within the cylindrical chamber just prior to the mating of the sphere with the valve seat. Therefore, the sphere not only acts as a one way valve during the relaxation stroke, but also secondarily as a piston to force a small amount of fluid in the reverse direction through the inlet port. This prevents droplets, dribbles or a miniscus from forming at the delivery nozzle which is ultimately communicated to the outlet port of the pump.

The invention also includes a switch assembly for providing an "On-Off" signal through electronic controls to a pump, as described above. The switch assembly comprises an indexing means coupled to a tool for providing an indication of the operative engagement between the tool and the workpiece. A switching means is also provided and is activated by the indexing means. The switching means provides the "On-Off" signal for the pump for a predetermined amount of withdrawal of the tool relative to the workpiece as indicated by the indexing means. Fluid is thus directed to the cutting location by the pump for a period of time after the tool and workpiece are relatively separated in order to provide additional cooling and to remove chips and other debris from the cutting surface. In particular, the switching means includes a microswitch which has a predetermined amount of overtravel. The indexing means engages the microswitch which is activated at a first position of the indexing means. The overtravel of the microswitch allows the indexing means to be advanced to a second position as the tool is being advanced into the workpiece. As the tool is then withdrawn from the workpiece, the indexing means will move from the second position to the first position. During this time the microswitch will remain activated and the pump will remain on, thus, delivering the cutting oil as described above. As the tool continues to be withdrawn from the workpiece, the indexing means will move away from the first position, thus allowing the microswitch to be deactivated and consequently shutting off the pump.

These and other embodiments of the present invention may be better understood by considering the detailed description in light of the following Figures, wherein like elements are referenced by like numerals.

BRIEF DESCRIPTION OF THE DRAWINGS

FIG. 1 is a perspective view of a drill press incorporating the pump devised according to the present invention.

FIG. 2 is a side elevational view in enlarged scale taken through lines 2—2 of FIG. 1 showing an indexing and switching assembly used to control the pump.

FIG. 3 is an enlarged sectional view taken through lines 3—3 of FIG. 2.

FIG. 4 is a side elevational view of the switching and indexing assembly shown in FIG. 2, shown in the configuration where the switch is activated.

FIG. 5 is a sectional view in enlarged scale taken through lines 5—5 of FIG. 1 showing the pump at the end of its relaxation stroke.

FIG. 6 is the sectional view of FIG. 5 showing the pump in its power stroke.

FIG. 7 is a fragmentary sectional view of the main piston as shown in FIGS. 5 and 6 when the pump is in the middle of its relaxation stroke.

FIG. 8 is an elevated sectional view taken through lines 8—8 of FIG. 5.

FIG. 9 is a sectional view in enlarged scale taken through lines 9—9 of FIG. 6.

FIG. 10 is a sectional view in enlarged scale taken through lines 10—10 of FIG. 7.

FIG. 11 is a sectional view in enlarged scale of the ball check valve of the present invention.

DETAILED DESCRIPTION OF THE PREFERRED EMBODIMENTS

The present invention is a reciprocating pump 20 for pumping cutting fluid of varied viscosities to the cutting surface in a machining operation. As shown in FIG. 5, reciprocating pump 20 is particularly characterized by including a collapsible piston 48, a magnetic armature 52, and a check valve 60 which effectuates a reverse pumping action. By virtue of a combination of these improvements, a pump is devised which is capable of pumping cutting fluids of varied viscosities, in various amounts, at variable intervals, and with a variable force. The amount of fluid, rate of pump strokes and force can be independently selected and varied by the use of electronic controls which incorporate standard timing chips. In addition, control of the pump is provided such that fluid is provided to the cutting surface for a predetermined amount of displacement between the tool and the workpiece. Any minimal movement of the tool away from the workpiece, such as partially retracting a drill to clear the chips, will automatically turn the pump off. Then, as the drill is advanced toward the workpiece, the pump will automatically start approximately ¼" before the drill reaches the previous depth. This prevents excessive use of expensive cutting fluids in a non-recirculating system such as the present invention. A reverse pumping action of a check valve prevents a miniscus being formed at the outlet nozzle of the pump so that there is no oil dribble, either during the operation of the pump or after it is shut down. The operation and design of the invention which realizes these advantages is described in detail below in connection with the Figures.

One application of the present invention is shown in FIG. 1, wherein a pump, generally denoted by reference character 20, has its output port connected to a flexible hose 22 and its input port connected to a source of lubricating and cooling fluid or cutting oil contained within a reservoir or supply can 24. Fluid is pumped from reservoir 24 through hose 22 to a conventional applicator nozzle 26, which directs a stream of fluid at the situs of the machining operation, more specifically the cutting surface between drill bit 28 and work piece 30. Drill bit 28 is driven by a conventional drill press, generally denoted by reference character 32, which is hand operated by a conventional rotary spindle 34. As spindle 34 is rotated by hand, bit 28 advances toward or away from workpiece 30, depending on the sense of rotation of spindle 34. As bit 28 is moved into close proximity of workpiece 30, pump 20 is turned on by an indexing and switching assembly, generally designated by reference character 36, which is electrically coupled to pump 20. Assembly 36, in turn, is mechanically coupled to spindle 34. In the illustrated embodiment, assembly 36 is coupled to spindle 34 by means of a flexible wire 38, attached at one end to spindle 34 and at the opposing end to the operating mechanism within assembly 36, in a manner described in greater detail in connection with FIGS. 2-4.

Although the present invention has been shown to be a nonrecirculating pump used in connection with a drill press, it is also possible that a pump could be similarly used with any type of machine operation, such as lathes or milling machines, and could be incorporated within a recirculating system or built into the machine itself, rather than retrofitted as suggested by the application illustrated in FIG. 1.

The operation of the present invention is best understood by first considering the elements of the pump as described in FIGS. 5-11 and then reviewing the manner in which the pump is controlled by assembly 36 as described in connection with FIGS. 2-4. Referring to FIG. 5, a sectional view of pump 20 is shown in enlarged scale, wherein pump 20 is inserted into reservoir 24, which contains fluid 40. The principal components of pump 20 include non-ferromagnetic elongated cylindrical housing 42 defining a bore 58, having an inlet port 44 at one end, and an outlet port 46 at the opposing end. A main, collapsible piston 48 is coupled at one end to a rod 50, disposed along the longitudinal axis of housing 42. Rod 50 is coupled at its opposing end to a ferromagnetic armature 52, which is acted upon by a solenoidal coil 54. Armature 52, rod 50 and main piston 48 together comprise a plunger, generally denoted by reference character 56, which reciprocates within bore 58 of housing 42 under the action of an electromagnetic driving force provided by an interrupted direct current supplied to coil 54 through a conventional electronic control unit. As plunger 56 moves upwardly within bore 58, as illustrated in FIG. 5, main piston 48 forces fluid 40, contained within bore 58, through outlet port 46 in a manner described in greater detail below. The upward movement of plunger 56 within housing 42 is the power stroke and occurs when coil 54 is energized, drawing armature 52 upward. The current to coil 54 is then interrupted, allowing plunger 56 to descend within housing 42 under the influence of gravity. This is defined as the relaxation stroke. During the relaxation stroke, collapsible piston 48, in a manner described in detail below, acts as a valve to facilitate the flow of fluid 40 past piston 48, as plunger 56 descends within housing 42. A measured amount of reverse flow from bore 58 through inlet port 44 is provided by a check valve, generally denoted by reference numeral 60. Check valve 60 provides a small amount of reverse flow through inlet port 44 and then closes to prevent any additional reverse flow after the predetermined amount.

FIG. 5 illustrates the configuration of plunger 56 after it has totally completed the relaxation stroke and is just about to begin the power stroke. FIG. 6 shows plunger 56 at a slightly later time during the power stroke when plunger 56 is moving upward within bore 58. Thus, as plunger 56 reciprocates within housing 42, fluid is drawn through inlet port 44, lifted by piston 48 and forced out of outlet port 46.

Consider now the detailed operation and cooperation of each of the elements described above. Referring again to FIG. 5, collapsible piston 48 includes a lower fitting 62 connected to the end of rod 50, and an upper fitting 64 having an annular bore 66, through which rod 50 is disposed. Upper fitting 64 is connected to rod 50 at a predetermined distance behind first fitting 62. A plate 68 having an annular hole 70, through which rod 50 is disposed, is positioned between upper and lower fittings 62 and 64. Plate 68, which may be in the form of an annular washer formed with an outer edge which is rounded in the axial direction and having a surface area which is substantially equal to the cross sectional area of bore 58. Thus, plate 68 provides a sliding seal within bore 58 as plunger 56 is displaced during the power stroke. The flapper plate 68 is sandwiched loosely between the upper fitting 64 and a lower fitting 76 and slides axially of the rod 50 to alternately engage a lower surface disposed normal to the axis of the rod 50 and a confronting upper surface 74 inclined with respect to the axis of such rod. As shown in FIG. 6, when plunger 56 moves upwardly during the power stroke, the resistive force of fluid against plate 68 forces plate 68 against surface 72 of fitting 62. This presents the maximal cross sectional area of plate 68 to the fluid within chamber 58, thereby forming a substantial seal and lifting fluid within bore 58 up through housing 42, with armature 52, and out through outlet port 46.

FIG. 9 illustrates the configuration of plate 68 during the power stroke as seen through lines 9—9 in FIG. 6. Plate 68 substantially blocks the entire annular cross section formed between the rod 50 and wall of the chamber 58, thereby cooperating with exposed annular surface 72 of fitting 62, formed between hole 70 and rod 50 to form a dynamic seal.

During the power stroke, surface 72 of lower fitting 62 abuts the adjacent surface of plate 68 and, more particularly, spans and covers the entire diameter of hole 70 within plate 68. Surface 72 thus provides a portion of the sealing surface of piston 48 when plunger 56 is in the power stroke.

After armature 52 has reached its maximum vertical position with respect coil 54, as shown in FIG. 6, coil 54 will be de-energized, allowing plunger 56 to fall. When plunger 56 falls, the resistive force of fluid resisting the fall of plate 68, as shown in FIG. 7, will move plate 68 from its position in abutment with lower fitting 62 against inclined surface 74 of upper fitting 64.

FIG. 10 illustrates a configuration of plate 68 during the relaxation stroke as seen through lines 10—10 of FIG. 7, where plate 68 is pressed against inclined surface 74 of upper fitting 64, thereby leaving large unobstructed areas in chamber 58 on opposite sides of tilted plate 68.

Thus, plate 68 presents a lesser cross section to fluid flow, thereby allowing fluid within chamber 58 to flow past piston 48 and armature 52 during the relaxation stroke. Hole 70 within plate 68 can be chosen of such a diameter to just allow rod 50 to be disposed therethrough when plate 68 is inclined. This will tend to center plate 68 and allow for even flow of fluid around piston 48 on the longitudinal axis of housing 42 during the relaxation stroke.

Therefore, it can be seen that piston 48 comprises a collapsible piston which acts during the power stroke as a sealing piston and during the relaxation stroke as a one-way valve. The operation of plate 68 is simply controlled by the inclination of surfaces 72 and 74 of fittings 62 and 64, respectively.

Although the illustrated embodiment shows the selective tilting of plate 68 as being caused by abutment of plate 68 with fittings 64 and 76, any equivalent means could be used as well. For example, rod 50 could be provided with an axial nipple on one side in the place of fitting 64 such that plate 68 would contact the nipple during the relaxation stroke. As before hole 70 would have a sufficiently large diameter to allow plate 68 to tilt when one side of plate 68 contacted the nipple.

As illustrated in the preferred embodiments in FIGS. 5-7, fitting 62 includes a finger 76. One-way check valve 60, in turn, includes a retaining element 78, which is threadably engaged into the end of housing 42, and which defines inlet port 44. Check valve 60 also includes a ball 80, disposed within retaining element 78. Retaining element 78 forms an enclosed cage for ball 80. Retaining element 78 has a plurality of openings 82, defined along its circumferential edge, including a valve seat 84, defined at a lower extremity as shown in FIG.

5, against which ball 80 seats. In addition, a press fit lid 87 is provided at the end of retaining element 78, and defines an opening 88, through which finger 76 is disposed when plunger 56 reaches the lowest travel of the relaxation stroke, as shown in FIG. 5. Finger 76 contacts ball 80 and forcefully urges ball 80 downward, against valve seat 84.

During the power stroke as shown in FIG. 6, the upward movement of piston 48 creates a suction within that portion of bore 58 lying below it, as illustrated in FIG. 6, thereby unseating ball 80 and drawing fluid through inlet port 44 through openings 82.

When plunger 56 is undergoing the relaxation stroke, as best shown in FIG. 7, the downward force of plunger 56 creates a slight pressure in chamber 58 above check valve 60, which with gravity causes ball 80 to move toward inlet port 44. As shown in enlarged detail in FIG. 11, retaining element 78 includes a closed cylindrical portion 86, below openings 82 and above valve seat 84. Thus, ball 80, during the last portion of its travel within retaining element 78, moves not within an open cage, but within a closed cylinder. Therefore, ball 80, at least during this last portion of travel, acts as a piston to force a predetermined amount of fluid from retaining element 78, through inlet port 44 in a reverse direction, namely that amount of fluid disposed in closed portion 86. The positive displacement of fluid from bore 58 by the pumping action of ball 80 as it travels through closed portion 86, is enough to prevent a miniscus from forming at the end of nozzle 26, shown in FIG. 1, by drawing the oil back slightly within hose 22. In addition, when pump 20 is turned off, fluid left within hose 22 will be drawn back slightly to prevent any partial siphoning action which might form a droplet and oil dribble from nozzle 26. The amount of fluid subject to such a reverse flow can be varied according to the design application at hand by varying the amount of volume enclosed within portion 86 of retaining element 78.

Consider now the operation of plunger 56 in connection with armature 52. Referring to FIGS. 5 and 6, pump 20 is inserted in reservoir 24 through cap 88, which threadably engages to the top of reservoir 24. Cap 88 is further sealed by the use of washers 90, although the seal need not be airtight, but only splash resistant.

Outlet port 46 is defined by fitting 92, of hose 22. Fitting 92 is disposed into housing 42 through a bore 94 defined in a collar 96 disposed on the top of housing 42, and further sealed by O-ring 98. A cap 100 is then threadably engaged to collar 96 to mechanically secure fitting 92 to housing 42. By rotating cap 100, fitting 92 is moved in or out of housing 42, thereby limiting travel of plunger assembly 56 which controls the volume of oil pumped through applicator nozzle 26 on each stroke of plunger assembly 56. Parts 92, 96 and 100 are not used in model with electronic volume control.

Armature 52 is disposed beneath the lower end 102 of fitting 92. End 102 is disposed in the same general proximity of coil 54. Therefore, when coil 54 is energized, armature 52 is drawn upward to contact or nearly contact lower end 102 of fitting 92, as shown in FIG. 6. When disposed at the bottom of the relaxation stroke, as shown in FIG. 5, finger 76 rests upon ball 80. When pump 20 is turned off, armature 52 moves to its lowermost position, illustrated in FIG. 5, but is maintained still well within the effect of the magnetic field of coil 54.

The power source for coil 54 is controlled by a rotary indexing assembly 36, better shown in FIGS. 2–4. FIG. 2, taken through lines 2—2 of FIG. 1, shows a side view of the elements within assembly 36. Flexible wire 38, coupled to spindle 34, is led through an abrasion resistant fitting 104 to a drive wheel 106. Wire 38 is then wrapped around drive wheel 106, as shown in FIG. 3, within a radially outwardly opening channel 108. Therefore, as wire 38 is extended from assembly 36 to the left, as shown in FIG. 2, drive wheel 106 will be rotated in a counter-clockwise direction by virtue of its wrapping in channel 108. A conventional clock spring 110, shown in sectional view in FIG. 3, is coupled by means of post 112 to drive wheel 106 which rotates about center post 114. The opposing end of spring 110 is fixed to center post 114 by conventional means, and post 114, in turn, is fixed to housing 116 by means of screw 118. Thus, as wire 38 is pulled away from housing 116, off drive wheel 106, drive wheel 106 will rotate in a counter-clockwise direction as shown in FIG. 2, and spring 110 will tighten. Spring 110 then pulls wire 38 back within housing 116, wrapping wire 38 around drive wheel 106, and into channel 108. The extent to which wire 38 can be wound onto drive wheel 106 is limited by a crimped collar 120, connected to wire 38 exterior to housing 116, which contacts fitting 104 when wire 38 assumes its minimal extension from assembly 36 as shown in FIG. 2.

Drive wheel 106 rotates an indexing wheel 122 by means of a slip clutch 124, best shown in FIG. 3. Slip clutch 124 is a smooth surfaced washer, such as a teflon washer, disposed on and rotatable about post 114. Indexing wheel 122 is a disc having a finger 126, shown in FIG. 2, which is used to actuate a conventional microswitch 128 as described below. Indexing wheel 122 is urged against slip clutch 124 by means of a combination of pressure washer 127, helical spring 129, and retaining washer 130. The amount of compression of spring 129 is adjusted by screwing screw 131 into post 114, thereby urging pressure washer 127, which is a metal washer, against metallic indexing wheel, 122 and in turn against slip clurch 124. Therefore, as drive wheel 106 is rotated by the extension of wire 38, sufficient friction exists between slip clutch 124 and drive wheel 106 on one hand, and indexing wheel 122 on the other hand to rotate indexing wheel 122 with drive wheel 106.

As shown in FIG. 4, finger 126 is rotated counter-clockwise and contacts lever 133 in a first position, provided as part of switch 128. Lever 133 bears against a push button 132, also included as part of switch 128. As indexing wheel 122 is rotated in a counter clockwise direction in FIG. 4, finger 126 is brought into contact with lever 133, which in turn is brought into contact with pushbutton 132. Indexing wheel 122 continues to rotate, thereby causing continued movement of lever 133 against pushbutton 132 until pushbutton 132 has been depressed by an amount sufficient to actuate switch 128.

Even after switch 128 is actuated, pushbutton 132 has an additional amount of play or overtravel, thereby allowing indexing wheel 122 and lever 133 to continue to rotate until the position shown in dotted outline in FIG. 4 is acheived. At this point, lever 133 has rotated about its pivotal coupling to switch 128 by the maximum amount permitted by pushbutton 132 to a second position. Assembly 36 would jam but for the action of slip clutch 124. Wire 38 continues to be extended as spindle 34 is rotated by the operator, and drive wheel 106 continues to rotate in a counter-clockwise direction. However, indexing wheel 122 is now stopped by the maximum displacement of lever 133 and pushbutton 132. Thus, the pump is turned on until operator reverses the rotation of spindle 34.

As the operator reverses the direction of spindle 34, wire 38 is drawn by means of spring 110 back into housing 116, and around drive wheel 106. Drive wheel 106 now rotates in a clockwise direction as shown in FIGS. 2 and 4. Indexing wheel 122 immediately begins to rotate in a clockwise direction under the drive of slip clutch 124, since no force impedes the clockwise movement of indexing wheel 122 in the configuration shown in FIG. 4. Lever 133 begins to be displaced from the second position and also rotates in a clockwise direction about its pivot point to switch 128. Pushbutton 132 begins to travel through its predetermined amount of play without deactivating switch 128. Thus, switch 128 will always remain activated until indexing wheel has rotated in a clockwise sense by a predetermined amount of degrees sufficient to allow lever 133 to rotate to a point where spring loaded pushbutton 132 will cause switch 128 to be deactivated.

Assembly 36 also includes a variable stop comprised of a manual control knob 134, shown in FIG. 3, threadably coupled to a post 136, and terminated at its opposing end within housing 116 with a rotatable friction plate 138. Friction plate 138 includes a stop finger 140, which extends across housing 116, toward drive wheel 106, and is positioned to engage index finger 126 when indexing wheel 122 has been rotated by a preselected amount in the clockwise direction, as shown in FIG. 2 and as shown in dotted outline in FIG. 4.

Friction plate 138 has a surface 142 which bears directly or indirectly against face plate 144 of housing 116. In the embodiment illustrated in FIG. 3, friction plate 138 bears against a cork or fiber washer 146, which provides the desired amount of frictional engagement between friction plate 138 and faceplate 144. Friction plate 138 and washer 146 are urged against face plate 144 by means of a helical spring 148, concentrically disposed about post 136. Spring 148 has one end compressed by the left surface of knob 134, as seen in FIG. 3, and the other end compressed by a pressure washer 150, which bears against surface 145 of face plate 144 opposing surface 147 of the face plate in contact with washer 146.

Thus, finger 140 may be rotated to any position with respect to indexing wheel 122, and is maintained in that position by the frictional engagement provided between friction plate 138 and washer 146 with faceplate 144, even when brought in contact with finger 126. In other words, although stop finger 140 of friction plate 138 is easily manually adjustable to any position, when finger 126 of indexing wheel 122 contacts stop finger 140 of friction plate 148, indexing wheel 122 will be stopped and begin to slip against slip clutch 124, while friction plate 138 is maintained in a stationary position. This is acheived by choosing the material for friction plate 138 and washer 146, which has a higher coefficient of friction than does the material of slip clutch 124, in addition, to appropriate selection of the compressive forces applied to the respective elements by springs 129 and 148.

Stop finger 140 is used to adjust the degree of travel of wire 38, or equivalently the rotation of drive wheel 106, which is necessary before finger 126 of indexing wheel 122 contacts lever 133 of switch 128, ultimately actuating pump 20. In the initial position, finger 126 is adjusted to contact stop finger 140, as shown in FIG. 4. This is achieved simply by rotating spindle 34 in a counter clockwise direction by an amount sufficient to pull enough of wire 38 from assembly 36 so that drive wheel 106 will rotate through a large enough angular displacement to set index finger 126 against stop finger 140 when spindle 34 is then rotated in a clockwise direction to its limit. When finger 126 contacts stop finger 140, drill 28 will be positioned at its maximum point of withdrawal from workpiece 30. If too much cable is pulled from drive wheel 106, clutch 124 will slip, allowing full rewind of any slack cable.

Drill 28 is then moved down toward workpiece 30, thereby causing indexing wheel 122 to rotate to the first position shown in solid outline in FIG. 4. Switch 128 will be activated, and pump 20 will commence operation just before tool 28 contacts workpiece 30. The user manually adjusts knob 134 by trial and error until pump 20 is activated at the appropriate time, approximately $\frac{1}{4}''$ before contacting workpiece.

Alternatively, face plate 144 can be calibrated, as shown in FIG. 1, to indicate where pump 20 will be activated with respect to work platform 152, upon which workpiece 30 is placed. In other words, knob 134 can be calibrated either with respect to work platform 152 and a specified length of bit 28, or can be directly calibrated by the amount of downward vertical displacement of chuck 154, in which latter case the operator mentally compensates for the length of drill 28 and the thickness of workpiece 30 in order to ensure that pump 20 is activated at the appropriate point.

Drill bit 28 will cut into workpiece 30 as pump 20 continues to operate. The further drill bit 28 penetrates into workpiece 30, the greater length of wire 38 is which will be drawn from drive wheel 106. However, index finger 26 will be pressed to a maximum extent against lever 133 in the second position indicated in broken line in FIG. 4, after which point slip clutch 124 will simply allow drive wheel 106 to continue rotating without further displacement of lever 133. As the operator then backs drill bit 28 away from the cutting surface, pump 20 will continue to operate as determined by the amount of overtravel in pushbutton 32 and lever 133, in order to provide greater access of the cutting oil to cool and wash away chips from the cutting surface. After the site has been machined according to the user's determination, approximately $\frac{1}{4}''$ withdrawal of drill bit 28 will cause index finger 126 to rotate in a clockwise sense in FIG. 4 by an amount sufficient to allow pushbutton 132 to fully extend and thereby deactivate switch 128 and pump 20. Thus cutting fluid is applied only just before and just after actual cutting is taking place and is automatically shut off during a movement of workpiece for additional drilling or replacement of workpiece.

A very important factor in cutting tool life is the reverse of the above sequence whereby the pump is turned on just before drill re-contacts workpiece after being partially withdrawn from hole to clear chips. If hole has been drilled one inch deep and drill retracted $\frac{1}{2}$ inch to clear chips oil flow will be shut off and then started again on downward movement of drill at approximately $\frac{1}{4}$ inch before reaching previous depth to insure oil flow before drill again starts cutting action.

Full withdrawal of drill to its maximum up position re-sets the friction clutches so that the pump will be turned on again at the initial pre-set position approximately $\frac{1}{4}$ inch above workpiece.

The illustrated embodiment has been described above only for the purposes of example and clarification and should not be taken to limit the spirit or scope of the invention as set forth in the following claims.

I claim:

1. Cutting fluid metering apparatus comprising;

a cutting fluid storage tank;

a cutting fluid pump housing formed by a tube having an inlet and outlet located at its bottom and top extremities, respectively;

mounting means for mounting said tube on said tank projecting vertically downwardly to submerge said bottom extremity in fluid contained in said tank;

a piston rod received in said tube;

drive means coupled with the top end of said piston rod for reciprocating said rod up and down relative to said tube;

a support fitting mounted on the bottom end of said piston rod and formed with upwardly facing horizontally extending support surface;

a tilt fitting on said rod above said support surface and formed with a downwardly facing drive surface inclined with respect to the horizontal;

a piston washer telescoped over said piston rod and interposed between said support surface and drive surface said washer being configured and sized to assume a pumping position flat over said support surface with the outer periphery thereof closely fitting the interior of said tube and to be engaged by said drive surface during the down stroke of said piston rod to be tilted to an orientation coextensive with said drive surface to provide for fluid flow between the opposite sides of said piston washer and the wall of said tube;

a check valve mounted on the bottom end of said tube for admitting flow in through said inlet and checking flow out said inlet whereby said drive means may be actuated to reciprocate said piston rod in said tube to alternately draw said support surface upwardly to engage the bottom side of said piston washer and raise said washer to lift fluid upwardly in said tube, while creating a negative pressure under said washer to draw fluid past said check valve and to then release said rod to be drawn downwardly under the influence of gravity to engage said inclined drive surface with the top surface of said washer to thereby tilt said washer to provide for relatively free flow past the opposite sides thereof and consequent relatively rapid dropping of said rod in said tube.

2. Cutting fluid metering apparatus as set forth in claim 1 wherein:

said check valve is in the form of a ball valve disposed in axial alignment beneath the bottom of said piston rod, and including a ball valve cage defining a cylindrical retraction chamber formed with a predetermined diameter, including a retaining ring at its top end and terminating at its bottom end in said inlet to said tube;

a ball in said cage having a diameter to closely fit said predetermined diameter; and a drive finger projecting from said piston rod a distance sufficient to, when said piston rod approaches the end of its down travel, project through said ring and engage said ball and drive it toward said inlet to thereby eject fluid trapped in said retraction chamber out said inlet and thereby create a negative pressure in said tube to thereby draw a small quantity of fluid back from said outlet.

* * * * *